May 2, 1961      W. L. NEELY      2,982,018
METHOD OF WELDING 9% NICKEL STEEL PLATES
Filed Sept. 25, 1958
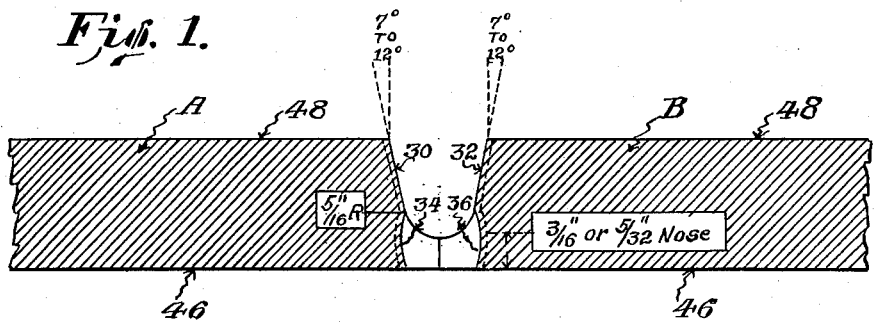
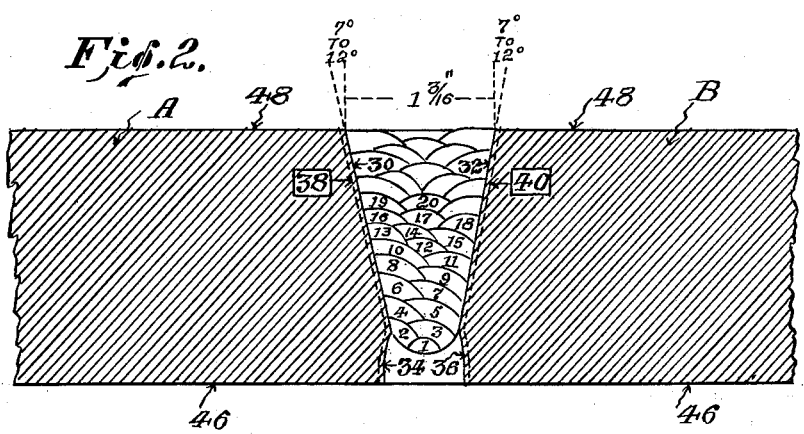
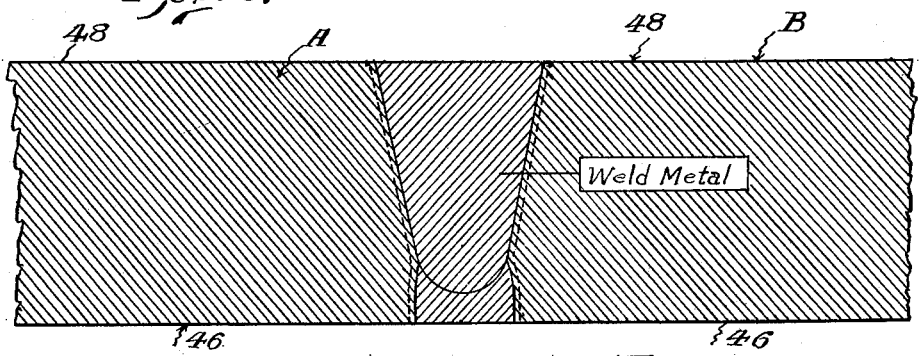
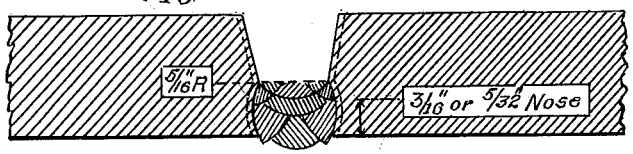
INVENTORS.
William L. Neely.
Daniel E. Igo
Attorney.

2,982,018
Patented May 2, 1961

2,982,018
METHOD OF WELDING 9 PERCENT NICKEL STEEL PLATES

William L. Neely, Chadds Ford, Pa., assignor to Lukens Steel Company, Coatesville, Pa., a corporation of Pennsylvania Filed Sept. 25, 1958, Ser. No. 763,302

3 Claims. (Cl. 29—483)

The present invention has for its principal object the production of a welded construction for 9% nickel steel plates of appreciable thickness, and which includes a welded joint of novel design, and a method of welding 9% nickel steel plates without stress-relieving. Stress-relieving has been defined in the Metallurgical Dictionary by J. G. Henderson, 1953, published by Reinhold Publishing Corporation, 330 West 42nd Street, New York, New York, page 317, as "a heat treatment for reducing the internal stresses in metal parts, such as castings, forgings, or machined parts, or parts that have been heat treated and quenched by procedures that are conducive to the development of such internal residual stresses, by heating the part to a suitable temperature, holding for a suitable time at that temperature, and cooling uniformly." These internal stresses affect the properties of the material both during welding and while being worked subsequent to welding.

In the evaluation of welds in 9% nickel steel, it has been found that joint contours heretofore used will not permit the successful bending of standard A.S.T.M. side bend specimens cut from welded test plates embodying these contours, so long as these test specimens are in the "as-welded" or non-stress-relieved condition. Since stress-relieving of any weldment is an appreciable fabricating cost factor, as well as being under present practice mandatory for 9% nickel steel welded pressure vessels, efforts have been directed to provide a welded joint construction which will permit the production of weldments of sufficient ductility in side bend specimens cut from test plates which are not stress-relieved.

The production of weldments by utilizing 9% nickel plates provided with weld grooves of the types disclosed herein eliminates the necessity for preheating prior to and during the welding operation, whereby fabricating economies are obtained. Heretofore in the welding of 9% nickel steel plates, pre-heats ranging from 200° F. to 400° F. have been required for plate gages ranging from a minimum of ½ inch, but preferably about one inch, to about 2 inches or more as a means of eliminating cracking in the initial deposits of weld metal. Utilization of the present method with one to two-inch gage 9% nickel plates welded with Inco (International Nickel Company) "A" coated electrodes and/or bare inert gas shielded filler wire known as Inco BP-70 have yielded successful side bend structures such as may be used in steel welded pressure vessels, without recourse either to pre-heating or to a stress-relief step prior to bending these structures, and with no cracking of the weld in either the root or subsequent passes.

Two factors appear to have a pronounced effect on 9% nickel welded plate joint performance. One is the selection of "joint design" or welding groove the dimensions and contours of which are such as permit effective utilization of the ductility of the deposited weld metal during bending, instead of a construction where the major bending force will be absorbed in the heat-affected zone, which latter possesses a lower degree of ductility than that of the deposited metal. The other factor concerns the preparation of the back or root side of the weld joint so as to provide a weld joint the width of which is equal to the narrowest portion of the joint face, or initial side of the weld joint. Cracking in the root deposit has been prevented by using a heavier nose or land, the same being approximately 5/32-inch to 9/32-inch, as opposed to the prior art nose or land of 3/32-inch in 9% nickel welded steel plates. The present invention also employs a minimal (preferably no) root opening. A welded joint prepared in this manner will, in welding 9% nickel plates, make it unnecessary to employ a heat treatment step (stress-relieving step) after welding to produce the necessary degree of ductility.

Referring to the drawings:

Figure 1 is a vertical sectional view partly broken away of a pair of 9% nickel steel plates and showing the root portion of the weld;

Figure 2 is a view similar to Figure 1 on an enlarged scale but showing the top of the weld area in full lines, and the lower portion after back grooving;

Figure 3 is a vertical section of a completed weld; and

Figure 4 is a section similar to Figure 1 but showing in section the lower weld portion.

The 9% nickel plates shown at A and B are made in accordance with the following analysis:

Carbon, max. percent _____ 0.13
Manganese, max. percent _____ 0.80
Phosphorus, max. percent _____ 0.035
Sulfur, max. percent _____ 0.040
Silicon, percent:
    Ladle analysis _____ 0.15 to 0.30
    Check analysis _____ 0.13 to 0.32
Nickel, percent:
    Ladle analysis _____ 8.50 to 9.50
    Check analysis _____ 8.40 to 9.60

The above analysis will result in the following physical properties in the plate material:

Tensile strength, min. p.s.i. _____ 90,000.
Yield strength, min. p.s.i. _____ 0.20 percent offset.
Elongation in 2 in., min.
    percent _____ 22.0.

Proportions given hereinafter are for plates of one inch and up to about two inches or greater in thickness. The welding groove forming the top portion is made by providing inclined sides 30 and 32, as seen in Figures 1 and 2. These sides are each inclined at an angle of from 7° to 12° to a line which is at right angles to the face portion of the plates. The root or nose portion is defined by the curved sides 34 and 36, and the dotted lines 38 and 40 indicate the heat-affected zones.

The top portion of the welding groove is filled with welding material which comprises beads numbered 1 to 20, it being understood that additional beads are deposited as needed until the groove is completely filled as shown in Figure 2. These beads are laid with different electrodes. Beads 1 and 2 are laid with 5/32-inch electrodes, all others with 3/16-inch electrodes, both types of electrodes being preferably Inco "A" coated electrodes, or with a bare wire as noted above. It will be further understood that any diameter electrode ranging from 1/8-inch to 3/16-inch may be employed. When using bare wire, electrodes of the BP-70 composition, which composition is substantially that of Inco A, wires up through 3/32-inch are recommended.

The type of joint used is a single U, with back grooving essentially as shown in the figures, the joint being fully restrained. The current for beads 1 and 2 comprises 130 amps. D.C.R.P. for a 5/32-inch diameter coated electrode, all other beads requiring 150 to 160 amps.

D.C.R.P. when 3/16-inch diameter coated electrodes are employed. It is recommended that beads 1 and 2 utilize 24 to 26 volts current, all others 26 to 28 volts current. The interpass temperature may be varied from room temperature to 250° F. or higher, without loss of the desired degree of ductility in the completed weld.

It will be noted that the back grooving of the plates is considerably wider than the normal back grooving employed under usual welding practices. Such back grooving can be accomplished by machining, chipping or grinding to a contour which eliminates or greatly minimizes any notch effect in the over-all joint contour or heat-affected zone contour.

The grooves 34 and 36 are cut on a 5/16-inch, these radii being critical.

The plate top surfaces are indicated by numeral 48 and their under or bottom surfaces are indicated by numeral 46. The root of the weld includes the zone at the bottom of the cross-sectional space or groove provided to contain the filler metal of the weld as seen in Figure 4.

The heavier nose or land will vary from 5/32-inch to 3/16-inch. Lesser gages do not consistently or reproductively prevent cracking in the root bead or weld deposit.

The 9% nickel plates are heat treated after rolling to 1650° F. and then preferably are air cooled. They are then reheated to 1450° F. and again air cooled. These heat treatments are normally applied to 9% nickel steel plate stock prior to any fabrication practice, such as rolling to shape, bending, nibbling, notching, or forming to any desired shape.

The weld joint back or root side has a width at least equal to the narrowest portion of the joint on the face thereof.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A method of welding 9% nickel steel plates having the following analysis:

| | |
|---|---|
| Carbon, max. percent | 0.13 |
| Manganese, max. percent | 0.80 |
| Phosphorus, max. percent | 0.035 |
| Sulfur, max. percent | 0.040 |
| Silicon, percent: | |
|     Ladle analysis | 0.15 to 0.30 |
|     Check analysis | 0.13 to 0.32 |
| Nickel, percent: | |
|     Ladle analysis | 8.50 to 9.50 |
|     Check analysis | 8.40 to 9.60 | comprising the steps of providing facing inclined sides on the abutting faces of the steel plates, shaped to a 7° to 12° inclination with respect to the center line of the weld joint, forming each of the root faces extending from the said inclined surfaces to the bottoms of the plates on radii of approximately 5/16-inch relative to the center line of the weld joint, depositing a predominantly nickel root weld metal in beads so as to extend upwardly 5/32 to 9/32-inch from the bottom of the plates in the root, the root side of the weld joint width being substantially equal to the narrowest width of the joint on the face or initial side of the weld joint, and filling the space between the said inclined sides by depositing a plurality of beads of predominantly nickel welding material between the inclined sides.

2. The method of claim 1 wherein said 9% nickel steel plates are non-stress relieved.

3. A method of welding 9% nickel steel plates having the following analysis:

| | |
|---|---|
| Carbon, max. percent | 0.13 |
| Manganese, max. percent | 0.80 |
| Phosphorus, max. percent | 0.035 |
| Sulfur, max. percent | 0.040 |
| Silicon, percent: | |
|     Ladle analysis | 0.15 to 0.30 |
|     Check analysis | 0.13 to 0.32 |
| Nickel, percent: | |
|     Ladle analysis | 8.50 to 9.50 |
|     Check analysis | 8.40 to 9.60 | comprising the steps of providing facing inclined sides on the abutting faces of the steel plates, shaped to a 7° to 12° inclination with respect to the center line of the weld joint, forming each of the root faces extending from the said inclined surfaces to the bottoms of the plates on radii of approximately 5/16-inch relative to the center line of the weld joint, depositing a predominantly nickel root weld metal in beads so as to extend upwardly 5/32 to 9/32-inch from the bottom of the plates in the root, the root side of the weld joint width being substantially equal to the narrowest width of the joint on the face or initial side of the weld joint, and filling the space between the said inclined sides by depositing a plurality of beads of predominantly nickel welding material between the inclined sides, said root weld and said filling weld being of the chemical analysis selected from the class consisting of

| | |
|---|---|
| C | .15 max. |
| Mn | 1.0–3.5% |
| Fe | 6.0–12.0% |
| S | .02 max. |
| Si | .75 max. |
| Cu | .50 max. |
| Cr | 13.0–17.0% |
| Cb | 1.0–3.0% |
| Mo | .5–2.0% |
| Ni and Co | Balance | and

| | |
|---|---|
| C | .10 max. |
| Mn | 2.0–2.75% |
| Fe | 10% max. |
| S | .015 max. |
| Si | .35 max. |
| Cu | .50 max. |
| Ti | 2.5–3.5% |
| Cr | 14.0–17.0% |
| Ni | 67% minimum |
| Co | 1% max. |

References Cited in the file of this patent

UNITED STATES PATENTS

| | | |
|---|---|---|
| 2,122,994 | Southgate | July 5, 1938 |
| 2,184,560 | Moss | Dec. 26, 1939 |
| 2,329,270 | Jones | Sept. 14, 1943 |

FOREIGN PATENTS

| | | |
|---|---|---|
| 538,570 | Great Britain | Aug. 8, 1941 |